United States Patent

Dietert et al.

[15] 3,638,478
[45] Feb. 1, 1972

[54] STRUCTURE FOR SAND TESTING

[72] Inventors: Harry W. Dietert, Kerrville, Tex.; Ralph E. Steinmueller, Detroit, Mich.

[73] Assignee: Harry W. Dietert Co., Detroit, Mich.

[22] Filed: Oct. 6, 1969

[21] Appl. No.: 864,078

[52] U.S. Cl. .......................................... 73/73, 73/38, 73/94
[51] Int. Cl. ......................................... G01n 5/02, G01n 3/08
[58] Field of Search ........................... 73/73, 38, 94, 432, 84

[56] References Cited

UNITED STATES PATENTS

| | | | |
|---|---|---|---|
| 2,791,120 | 5/1957 | Dietert et al. | 73/38 X |
| 2,863,191 | 12/1958 | Dietert et al. | 259/15 Y |
| 3,050,992 | 8/1962 | Steinmueller et al. | 73/93 |
| 3,172,285 | 3/1965 | Dietert et al. | 73/38 |
| 3,335,787 | 8/1967 | Dietert et al. | 73/38 |
| 3,353,407 | 11/1967 | Dietert et al. | 73/94 X |
| 3,448,608 | 6/1969 | Bishop et al. | 73/94 |

*Primary Examiner*—James J. Gill
*Assistant Examiner*—Ellis J. Koch
*Attorney*—Whittemore, Hulbert & Belknap

[57] ABSTRACT

Automatic structure is disclosed for sequentially testing moisture content and compactability, permeability, and deformation and strength of a sample of foundry sand. The moisture content and compactability and the deformation and strength of the sand may be tested simultaneously. The sample of foundry sand is positioned in a cylinder and compacted by a pair of opposed plungers movable into and out of the cylinder. One of the pistons includes moisture-sensing probes therein. The compacted sand sample is exactly positioned in the cylinder and air is blown therethrough to determine the permeability of the sand after which the specimen is moved out of the cylinder into contact with one of the pistons and the sand specimen is deformed and broken. The compactability, deformation and strength of the sand sample are determined through the use of linear differential transformers registering movement of the pistons with respect to each other.

4 Claims, 4 Drawing Figures

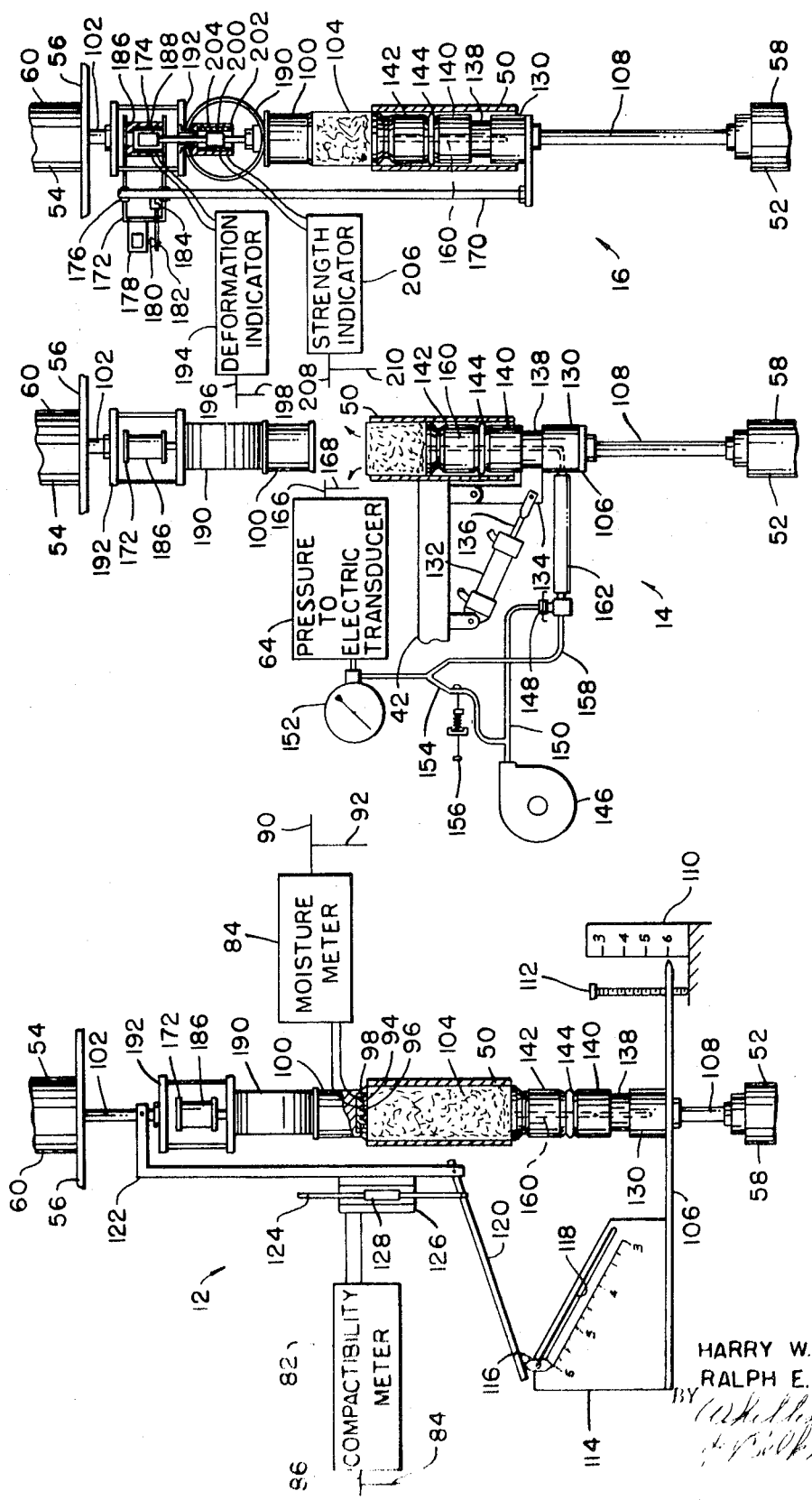

STRUCTURE FOR SAND TESTING

BACKGROUND OF THE INVENTION

1. Field of the Invention

The invention relates to granular material testing structure and methods and refers more specifically to automatic structure for sequentially determining the moisture content and compactibility, the permeability, and the deformation and strength of a sample of foundry sand. The moisture content and compactibility and the deformation and strength may be determined at substantially the same time with the disclosed structure.

2. Description of the Prior Art

In the past, separate apparatus have often been supplied for determining moisture content, compactibility, permeability, deformation and strength of granular material such as foundry sand. Such apparatus normally required a plurality of separate sand samples, often of different size, and the separate accomplishment of individual tests at different times requiring separate handling of the individual sand samples. Wherein a plurality of tests of granular material has been possible in a single apparatus in the past, often the apparatus has not been automatic, requiring recording of test results followed by tedious computations to determine an ultimate test result, often resulting in computational errors.

SUMMARY OF THE INVENTION

In accordance with the present invention, there is provided a single automatic structure including mechanism for determining the moisture content and compactibility of a sample of granular material substantially simultaneously, for measuring the permeability of the compacted sample, and for subsequently determining the deformation of the sample of granular material and the strength of the sample, again substantially simultaneously. Each of the separate test results may be directly indicated in the ultimately desired units with the apparatus disclosed through the use of properly positioned linear differential transformers in the case of compactibility, deformation and strength tests, properly calibrated orifices and air gauges in the case of the permeability test, and properly sized electrical components and indicating meter in the case of the moisture content test.

BRIEF DESCRIPTION OF THE DRAWINGS

FIG. 2 is a diagrammatic view of the moisture content and compactibility testing portion of the automatic structure illustrated in FIG. 1.

FIG. 3 is a diagrammatic view of the permeability testing portion of the automatic structure illustrated in FIG. 1.

FIG. 4 is a diagrammatic view of the deformation and strength testing portion of the automatic structure illustrated in FIG. 1.

DESCRIPTION OF THE PREFERRED EMBODIMENT

Figure 1:
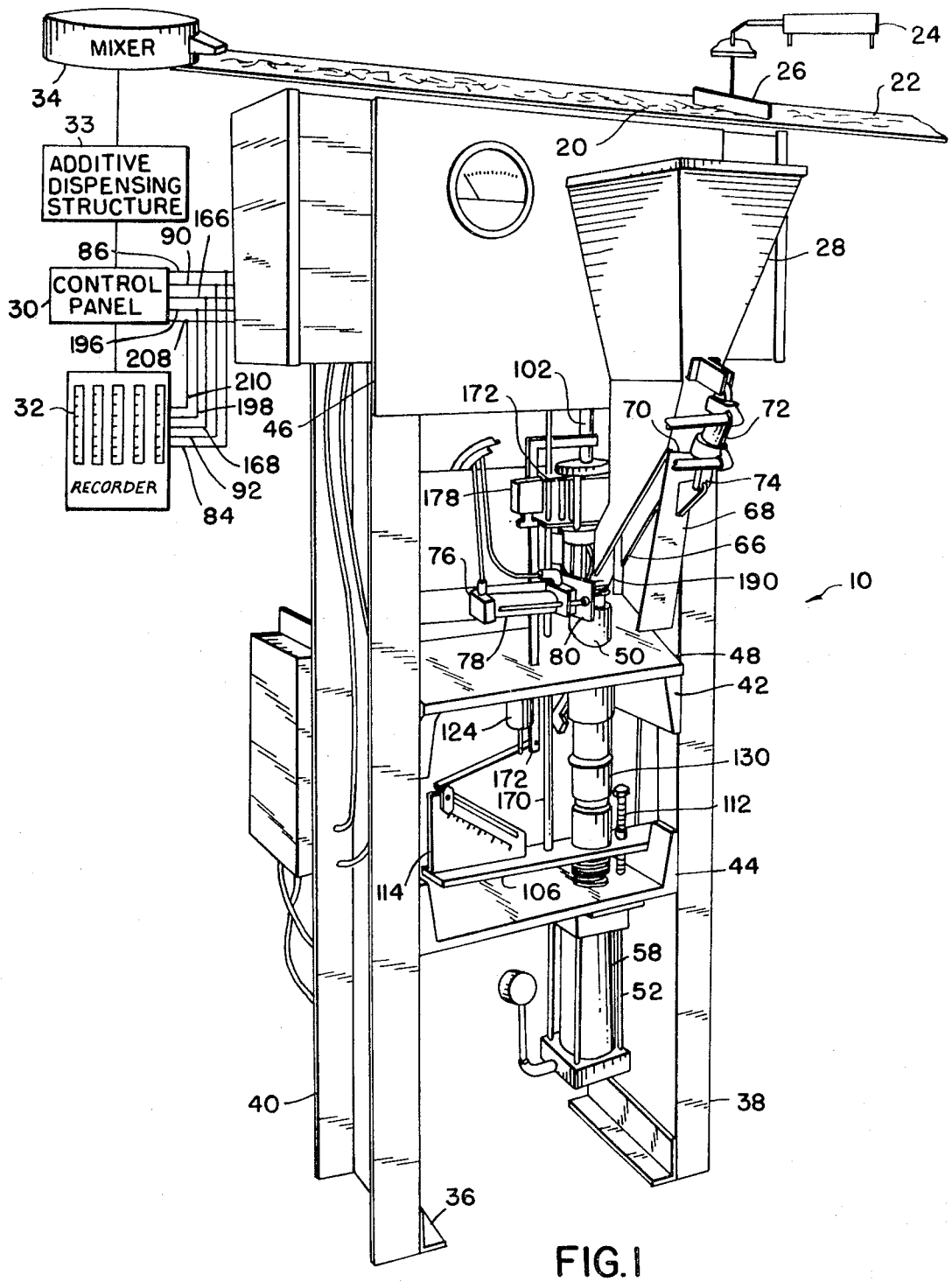
FIG. 1 is a perspective view of automatic structure for testing the moisture content, compactibility, permeability, deformation and strength of foundry sand in accordance with the method of the invention constructed in accordance with the invention.

The automatic sand-testing structure 10 illustrated in FIG. 1 includes a moisture content and compactibility testing structure portion 12, a permeability-testing structure portion 14, and a deformation and compressive strength testing structure portion 16.

The automatic sand-testing structure 10 is constructed to receive tempered sand 20 from a foundry conveyor belt 22 or the like through actuation of the piston and cylinder structure 24 to position the deflector 26 so that tempered sand 20 is cammed from the conveyor 22 into the hopper 28. The sample of sand from the conveyor 22 may first pass through a vibrating screen (not shown) if desired.

After completion of moisture content, compactibility, permeability, deformation and strength testing of the sand sample, signals representative of the tested properties of the foundry sand are fed to the control panel 30 and recording structure 32 from the automatic sand-testing structure 10. A permanent record of the tested properties of the sample of foundry sand is produced in the recorder 32. The control panel provides signals to the additive dispensing structure 33 so that additive is provided to sand in the mixing mill 34 in accordance with the tested properties of the sample of tempered foundry sand. The tempered foundry sand on the conveyor 22 will thus be automatically corrected in accordance with the tested properties thereof with a relatively simple online testing system, the heart of which is the automatic sand-testing structure 10.

As shown in FIG. 1, the automatic sand-testing structure 10 includes a base 36, vertically extending columns 38 and 40, crossbars 42 and 44 and a third hidden upper crossbar 56 all of which may be structural steel, and the panel 46 and apron 48 which may be of sheet metal. A hollow sample cylinder 50 open at both ends is secured to crossbar 42 and is positioned between the lower pneumatic piston and cylinder structure 52 and the upper pneumatic piston and cylinder structure 54.

The piston and cylinder structure 52 is secured to the crossbar 44, while the piston and cylinder structure 54 is secured to upper crossbar 56 positioned behind the panel 46 in FIG. 1 and illustrated in FIGS. 2 through 4. The cylinders 58 and 60 of the piston and cylinder structures 52 and 54 are thus maintained in a fixed position, while the pistons (not shown) and piston rods 108 and 102 connected thereto are free to move toward and away from the open ends of the sample cylinder 50.

The hopper 28 for receiving the sand sample from conveyor 22 is secured to the upper crossbar 56 through the panel 46 and as shown is in the shape of an inverted pyramid, the apex 66 of which is positioned close to the upper end of the sample cylinder 50. The side 68 of the hopper 28 adjacent the apex thereof is provided with hinge means 70 and is adapted to be opened and closed by means of the pneumatically actuated piston and cylinder structure 72 having a piston rod 74 pivotally connected to the side 68 of the hopper 28.

Thus, a sand sample in hopper 28 may be either directed toward the sample cylinder 50 to fill the cylinder 50 with a sample of foundry sand when the piston and cylinder structure 72 is actuated through the pneumatic lines connected thereto to extend the piston rod 74, or the sand sample may be dumped and deflected by the sheet metal apron 48 into a retainer (not shown) which may be positioned at the front of the sand-testing structure 10 and from which the tempered sample of foundry sand may be returned to the belt 22 if desired.

Automatic strike-off structure 76 is illustrated positioned adjacent the top of the sample cylinder 50. The automatic strike-off structure 76 includes a pneumatically actuated piston and cylinder structure 78 and a rubber strike-off plate 80 secured to a piston rod connected to the piston of the piston and cylinder structure 78.

On actuation of the piston and cylinder structure 78, the strike-off plate 80 is moved across the top of the sample cylinder 50 having a sample of sand therein to strike off any excess sand over the top of the cylinder 50 onto the apron 48. The strike-off plate is then retracted to ready the automatic sand-testing structure 10 for a first sequential test of the sample of granular material in the sample cylinder 50.

The sample of granular material in the sample cylinder 50 is first compacted and the percentage of compaction thereof is determined and may be displayed on a compactibility meter 82 which also provides a signal to the recorder 32 and the control panel 30. Simultaneously the percent moisture of the sand sample may be determined by the compactibility and moisture-testing structure portion 12 of the sand-testing structure 10 and recorded on the moisture meter 84 from which signals are also passed to the control panel 30 and recorder 32 over the conductors 90 and 92. The compatibility and moisture-testing structure portion 12 of the automatic sand-testing structure 10 is best shown diagrammatically in FIG. 2.

In FIG. 2, the percentage moisture determination structure includes a pair of concentric electrodes 94 and 96 separated by an electrical insulator 98 in the face of the plunger or ram 100 connected to the piston rod 102 actuated by the upper piston and cylinder structure 54. The moisture content of the sand sample 104 in the cylinder 50 may thus be determined at a constant pressure applied by the upper piston and cylinder structure 54 in conjunction with a usual moisture meter 84 which may be a Wheatstone bridge circuit, one leg of which is the resistance of the sand sample between the electrodes 94 and 96.

Moisture meters 84 are common in the art and will not, therefore, be disclosed in detail. It will be understood, however, that the moisture meter 84 may be temperature-compensated to eliminate variations in the percent moisture determination thereby due to variations in temperature of the sample of granular material 104.

The particular structure provided by applicant for determining percent compactibility of the sample of granular material 104 includes a plate 106 secured to the piston rod 108 actuated by the lower pneumatic piston and cylinder structure 52. A scale 110 is provided at one side of the piston rod 108 and in conjunction with the vertical position of the plate 106 relative to the sample cylinder 50 provides an indication of the initial depth of sand in the sample cylinder 50 as set by the adjusting screw 112. A scale 114 which is positioned at an angle to the vertical, as illustrated best in FIG. 2, is provided on the other end of the plate 106 and in conjunction with the pivot structure 116 which is adjustable along the slot 118 in the scale 114 provides a pivot point for the lever 120 corresponding to the depth of sand initially in the sample cylinder 50. Lever 120 as illustrated is positioned over the pivot structure 116 at one end and is pivotally secured at the other end to the rigid bar 122 rigidly connected to piston rod 102. A linear differential transformer 124 having a coil 126 secured to the bar 122 and having a core 128 pivotally connected to the lever 120 is provided to produce an electric signal output proportional to the percent compactibility of the sand sample in the sample cylinder 50.

In operation, the cylinders 58 and 60 are actuated so that the bottom plunger 130 moves upward in the sample cylinder 50 and the top plunger 100 moves down in the sample cylinder 50 to compact the sand sample 104 under a predetermined pressure from the piston and cylinder structures 52 and 54. Relative movement of the piston rods 102 and 108 will produce pivoting of the lever 120 about the rod 122 and consequent movement of the core 128 within the coil 126 of the linear differential transformer. The movement of the core within the coil will provide an output signal from the coil 126 proportional to the percent compaction of the sand sample 104.

Proper choosing of the angle of inclination of the scale 114 and slot 118 will permit direct reading of percent compactibility of sand samples of different initial height in the cylinder 50 providing that the pivot structure 116 is moved along the slot 118 to a point corresponding to the initial depth of sand sample in the cylinder 50 as indicated on the scale 110.

The permeability-testing structure portion of the automatic sand-testing structure 10 is best shown in FIG. 3 and includes the piston and cylinder structure 132 pivotally mounted to the crossbar 42 and the lock 134 pivoted to the crossbar 42 at one end and to the piston rod 136 of the piston and cylinder structure 132 adjacent the other end. The piston and cylinder structure 132 and the lock 134 are operable in conjunction with the lower plunger 130 and in particular the annular groove 138 therearound to lock the bottom portion 140 of the plunger 130 in a vertical position whereby on applying downward force on the piston rod 108 by means of piston and cylinder structure 52, the upper portion 142 of the plunger 130 bears against the O-ring 144 to cause expansion thereof and thereby seal the bottom of the sample cylinder 50 for the permeability test.

The permeability-testing structure 14 further includes the blower 146 connected to the precision blower orifice 148 through the pneumatic line 150 and connected to the permeability gauge 152 through the pneumatic line 154 which may be closed by means of the valve structure 156. The side of the orifice 148 away from the blower 146 is also connected to the permeability gauge 152 through pneumatic line 158 and is connected through an opening 160 in the lower plunger 130 and the pneumatic line 162 into the sample cylinder 50 beneath the compacted sand sample 104.

In operation, after the sand sample 104 has been compacted by the moisture content and compactibility testing structure portion 12 of the automatic sand-testing structure 10, the compacted sand sample 104 is moved upward in the sample cylinder 50 by the lower plunger 130 to provide exactly 2 inches of the sand sample remaining in the sample tube 50 and the bottom of the sample cylinder 50 is closed by means of the expanded O-ring 144. The blower which delivers a closely regulated air pressure to the orifice 148 is then actuated and the pressure drop across the orifice 148 is indicated at the permeability gauge as a measure of the permeability of the compacted sand sample. Through a pressure to electrical transducer 164, an electrical signal may be provided to the recorder 32 and the control panel 30 over conductors 168 and 166 respectively which is proportional to the permeability of the sand sample.

The deformation and strength testing structure portion 16 of the automatic sand-testing structure 10 is best shown in FIG. 4 and includes a rod 170 secured to the piston rod 108 for movement with the lower plunger 130, and a carriage 172 for movably supporting the linear differential transformer coil 174. The rod 170 extends through bushings 176 in the carriage 172. A solenoid 178 having armature 180 is operable on actuation to pivot the lever 182 whereby the locking head 184 holds the rod 170 against one side of the bushings 176 to secure the carriage 172 and the coil 174 of the linear differential transformer 186 to plunger 130 for movement therewith. The core 188 of the transformer 186 is connected through the force ring 190 and the structure 192 to the piston rod 102 for movement therewith.

In operation, when it is desired to test the deformation of the sand sample 104, which is a measure of the plasticity of the sand and related to the toughness thereof, the compacted sand sample is moved into contact with the upper plunger 100 in its fully up position which is at 2 inches above the top of the sample cylinder 50. The solenoid 178 is actuated to lock carriage 172 to the rod 170 and pressure is applied to the plunger 130 to load the sand sample 104 at a predetermined rate such as that specified by the American Foundry Society in determining compressive strength of a sand sample.

The deformation of the sand sample is measured as the change in the length of sample until the rate of sample collapse exceeds the rate of load. Since the coil 174 of the transformer 186 moves upward with the lower plunger 130 and the upper plunger 100 is maintained stationary except for the deformation of the force ring 190, and since the core 188 of the transformer 186 is connected to the force ring to move in accordance with the deformation of the force ring, the relative movement between the core 188 and coil 174 of transformer 186 and the electric signal generated thereby will be a true indication of the deformation of the sand specimen 104 and may be indicated on deformation indicator 194 in inches of deformation per inch of length at ultimate load. A control signal indicating the deformation of the sand specimen 104 may also be passed to the control panel 30 over the conductor 196 and the deformation may be recorded on the recorder 32 by means of a signal from the conductor 198.

Simultaneously with the sequential testing of the deformation of the sand sample 104, the compressive strength of the sand sample 104 is tested. Thus, with the upper plunger 100 positioned in its uppermost position, that is, at 2 inches above the top of the sample cylinder 50, the lower plunger 130 as previously indicated is moved upward in the sample cylinder 50 at a rate which may be variably controlled in accordance with the distance the sand sample is from the plunger 100 so that on contact of the sand sample 104 with the upper plunger 100, the rate of load on the sand sample will be at the above-indicated specified rate to provide a compressive strength test.

As the plunger 130 moves up, loading the sand sample 104, the force ring 190 is deformed to move the core 200 of the linear differential transformer 202 with respect to the coil 204 thereof to provide an electric output signal from the coil of the differential transformer 202 to the compressive strength indicator 206 which will indicate the ultimate compressive strength of the sand sample 104. Again, the signal representing the compressive strength of the sample of sand 104 may be passed to the control panel 30 over conductor 208 and to the recorder 32 over conductor 210.

Thus, in overall operation of the automatic sand-testing structure 10, a sample of tempered sand from the conveyor 20 is fed to the hopper 28 on actuation of the cylinder and piston 24 and is passed into the sample cylinder 50 with the top plunger 100 in its fully up position. Any excess sand from the sample in the hopper 28 is discharged through the side 68 of the hopper in an open condition on actuation of the cylinder and piston 72. The sample of sand in the cylinder 50 is struck off by the strike-off plate 80 on actuation of the cylinder and piston 76.

The plungers 100 and 130 are then advanced toward each other at a predetermined pressure and the percent compactibility of the sand sample 104 is determined by the structure 12 which has previously been set to indicate on the pivot member 116 the height of the sand sample in the cylinder 50. The percent compactibility signal from the linear differential transformer 124 is used to actuate the compactibility meter and is sent to the recorder 32 and control panel 30.

Substantially simultaneously the percent moisture content of the sand sample 104 is measured by means of the probes 94 and 96 impressed at a predetermined pressure on the sand sample 104 in cooperation with the moisture meter 84 where it is indicated. A signal representative of the percent moisture content of the sand sample 104 is passed to the control panel 30 and to the recorder 32.

The permeability of the sand sample 104 is then sequentially determined by the structure 14 with the bottom of the sand sample 2 inches below the top of the sample cylinder 50 and is indicated on the permeability gauge 152. Again, an electrical signal proportional to the permeability of the compacted sand sample is passed to the control panel 30 and recorder 32.

Subsequently and sequentially to the permeability determination, with the upper plunger 100 in its upper position 2 inches from the top of the sample cylinder 50, the lower plunger 130 is actuated to move the sand specimen upward in the sample cylinder 50 into contact with the upper plunger. The solenoid 182 is actuated to lock the rod to the carriage 172 and the pressure on the sand sample from the bottom plunger 130 is increased at a controlled rate whereby signals are provided substantially simultaneously from the linear differential transformers 186 and 202 representing the deformation of the sand specimen and the compressive strength thereof respectively which are indicated on the deformation indicator 194 and compressive strength indicator 206. Electric signals representative of the deformation of the sand specimen and compressive strength thereof are also passed to the control panel 30 and the recorder 32.

The recorder 32, which may be a multichannel recorder having a chart divided into vertical columns, provides a permanent record of the tests of the sand sample. The control panel 30 will provide a signal to the additive addition structure 33 causing an additive to be added to the foundry sand in the mixing mill 34 to provide tempered foundry sand on the conveyor 22 having the desired characteristics.

The recorder, control panel, additive addition structure, mixing mill and conveyor form no part of the present invention and are, therefore, not disclosed in detail herein. They are, however, within the skill of the art to provide in conjunction with the disclosed automatic sand-testing structure 10.

The exact sequencing circuits and pneumatic control connections for the automatic, sequenced and simultaneous operations of the sand-testing structure 10 have not been considered in detail since they would unduly complicate both the drawings and specification without adding materially thereto. Sequencing circuits and pneumatic connections of the disclosed automatic sand-testing structure 10 are easily within the ability of the art to provide in view of the disclosed automatic sand-testing structure 10.

Further, it will be noted that should a shear strength test be desired, it could be provided in the sand-testing structure 10 at the expense of the deformation test and compressive strength tests by horizontally orientated structure such as that used for the compressive strength test. Also, a temperature test could be provided if desired by including temperature probes on the conveyor 22 or in one of the plungers 100 and 130.

What we claim as our invention is:

1. Structure for measuring at least one of the compactibility and moisture content of a sample of granular material comprising a sample cylinder having an axis of generation, means adjacent the top of the sample cylinder for placing a sample of granular material in the sample cylinder, piston and cylinder structures positioned in line with the axis of generation of the sample cylinder at the top and bottom thereof, plunger means connected to the piston and cylinder structures movable along the axis of generation of the sample cylinder into and out of the sample cylinder on actuation of the piston and cylinder structures, a differential transformer coil secured to one of the plunger means, a linkage pivotally secured to the one plunger member, a transformer core positioned within the transformer coil and pivoted to the linkage for movement within the transformer coil on pivotal movement of the linkage, a plate secured to the other of the plunger means having an oblique scale secured thereto, a slide on said oblique scale engageable with the linkage for pivoting the linkage in accordance with the relative position of the plunger means and the setting of the slide thereon and a stationary scale adjacent the plate for indicating the setting of the slide on the oblique scale in accordance with the length of the sample cylinder.

2. Structure as set forth in claim 1 wherein the means for measuring at least one of the compactibility and moisture content of the sample of granular material further includes moisture probes positioned in one of the plunger means for sensing the moisture content of the sample of granular material simultaneously with the measuring of the compactibility of the sample of the granular material.

3. Structure for determining the permeability of a compacted sample of granular material comprising a sample cylinder having an axis of generation, means adjacent the top of the sample cylinder for placing a sample of granular material in the sample cylinder, piston and cylinder structures positioned in line with the axis of generation of the sample cylinder at the top and bottom thereof, plunger means connected to the piston and cylinder structures movable along the axis of generation of the sample cylinder into and out of the sample cylinder on actuation of the piston and cylinder structures, an annular groove around one of the plunger means, a support fixed in relation to the sample cylinder, a locking member carried by the fixed support one end of which is adapted to fit within the annular groove on the one plunger means in one position thereof for locking the one plunger means in a predetermined position with respect to the sample cylinder and automatic means for moving the locking means into the annular groove around the one plunger means, a source of air under pressure and means to pass the air under pressure into the sample cylinder below the compacted sample of granular material therein and between the one plunger means and the sample.

4. Structure for measuring at least one of the deformation and ultimate strength of a compacted sample of granular material comprising a sample cylinder having an axis of generation, means adjacent the top of the sample cylinder for placing a sample of granular material in the sample cylinder, piston and cylinder structures positioned in line with the axis of generation of the sample cylinder at the top and bottom thereof, plunger means connected to the piston and cylinder structures movable along the axis of generation of the sample cylinder into and out of the sample cylinder on actuation of the piston and cylinder structures, a force ring positioned in one of the plunger means, a coil of a differential transformer secured to the force ring, a core for the differential transformer secured to the opposite side of the force ring from the coil of the differential transformer and extending thereinto on the axis of generation of the sample cylinder, a carriage positioned between the force ring and the one piston and cylinder structure in the one plunger means, a second differential transformer coil secured to the carriage, a second differential transformer core secured to the first differential transformer core on the axis of the sample cylinder extending into the second differential transformer core on the axis of generation of the sample cylinder and means for selectively securing the carriage to the other plunger means for movement toward the one plunger means whereby the deformation and strength of the single sample of granular material may be measured simultaneously.

* * * * *